United States Patent [19]

Judd et al.

[11] Patent Number: 4,463,778

[45] Date of Patent: Aug. 7, 1984

[54] SAUSAGE CASING FORMED FROM REGENERATED CELLULOSE WITH AN INTERNAL VINYL ACETATE COATING

[75] Inventors: Henry E. Judd; Arthur M. Dowell, Jr., both of Danville; Matiur Rahman, Champaign, all of Ill.

[73] Assignee: Teepak, Inc., Chicago, Ill.

[21] Appl. No.: 64,255

[22] Filed: Aug. 6, 1979

Related U.S. Application Data

[63] Continuation of Ser. No. 887,578, Mar. 17, 1978, abandoned.

[51] Int. Cl.$^3$ .............................................. F16L 11/04
[52] U.S. Cl. ................................. 138/118.1; 138/145; 426/135; 428/508

[58] Field of Search ............................. 138/118.1, 145; 206/804; 428/36, 507, 508, 510; 426/105, 132, 138, 135, 420, 543, 124

[56] References Cited

U.S. PATENT DOCUMENTS

| | | | |
|---|---|---|---|
| 3,144,377 | 8/1964 | Eastes | 428/510 |
| 3,383,223 | 5/1968 | Rose | 138/118 X |
| 4,131,137 | 12/1978 | Lustig et al. | 138/118.1 |
| 4,192,904 | 3/1980 | Gerigk et al. | 428/510 X |

Primary Examiner—James E. Bryant, III
Attorney, Agent, or Firm—Michael L. Dunn; William J. Crossetta; Paul Shapiro

[57] ABSTRACT

Sausage casings formed from regenerated cellulose are coated on their internal surfaces with a thin layer of a vinyl acetate polymer which is effective in causing the casing to adhere to a sausage emulsion and follow the shrinkage of the sausage during curing.

2 Claims, No Drawings

SAUSAGE CASING FORMED FROM REGENERATED CELLULOSE WITH AN INTERNAL VINYL ACETATE COATING

This is a continuation of Ser. No. 887,578, filed 3/17/78, now abandoned.

BACKGROUND OF THE INVENTION

1. Field of the Invention

This invention relates to new and useful improvements in sausage casings.

2. The Prior Art

Dry sausage, of which the various salami and cervelats are examples, is usually prepared by a process which involves drying as one of the process steps. Dry sausage is ordinarily served cold, without further cooking by the consumer. The term "dry sausage" as used herein includes within its meaning the entire range of dry and semi-dry sausage products.

The manufacture of dry sausage customarily involves mixing desired proportions of fat and lean meats, beef or pork or mixtures thereof, with selected spices, seasonings, and curing materials to form an emulsion which is initially cured at a few degrees above freezing (36° to 38° F.) for one or two days so that they will be preserved sufficiently to be smoked and dried.

The chill cured meat emulsion is then firmly packed into casings of suitable size and shape, and the ends of the casings are tied ready for delivery to the drying room or smokehouse, depending on the type of sausage. The stuffed dry sausage is smoked and then dried, while unsmoked dry sausage is dried only. The drying and curing time will vary with the particular type of sausage being processed and to some extent with the processing conditions. However, 30 to 60 days is usually considered a minimum time, and periods of 60 to 90 days or more are used under some circumstances.

Previously, the sausage meat emulsions were stuffed into casings formed of natural materials or animal products such as sewn beef middles and hog casings. More recently, synthetic materials have been developed out of which casings could be formed, particularly casings formed of regenerated cellulose per se or of the product known in the art as fibrous casing and which is composed of cellulosic fibers, preferably a long fiber saturating tissue, impregnated with and held together by regenerated cellulose.

Fibrous casing is made by passing a ribbon of paper around a mandrel to form a tube, applying viscose to the outside surfaces of the paper tube and in between the overlapped portion thereof which is to become a seam. The viscose impregnated tube is passed through a coagulating bath containing acid wherein regeneration of the viscose takes place. The tube is then washed and dried according to the procedures described, for example, in U.S. Pat. Nos. 1,937,225 and 2,045,349.

One of the drawbacks of such regenerated cellulose casing materials is their lack of ability to shrink with the sausage during the drying of the sausage emulsion. In the preparation of dry sausages, the sausage encounters up to a 30–40% weight loss and tends to shrink away from the synthetic casing and leave gaps between the meat and the casing in which there is a tendency for mold and/or a so-called "brown ring" to develop. The brown ring is generally comprised of a layer of grease which will rapidly turn rancid during storage of the dry sausage. This problem is ordinarily not encountered when natural casings are used since natural casings tend to expand and contract with the sausage during curing.

The problem of producing regenerated cellulose casings which adhere satisfactorily to dry sausages during preparation thereof has been at least partially solved by the application of certain proteinaceous materials such as gelatin and glutraldehyde as a protein hardening agent to the interior of such casings, as disclosed in U.S. Pat. No. 3,383,223. One drawback to the use of hardened gelatin as an adhesive coating for casing interiors is that the coating may adhere too well to the meat, with the result that when it is attempted to remove the casing from the meat mass, there is occasionally a tendency for some meat to adhere to the casing and be torn from the sausage with the casing, thereby causing surface marring of the sausage. In other instances, due to variations in the meat emulsion formulations or in the processing conditions, there can result a degree of adherence of the casing to the meat product which hinders removal of the casing from the product encased therein to a degree that a substantial amount of meat product is removed with the casing.

SUMMARY OF THE INVENTION

This invention is based upon our discovery that regenerated cellulose casings, including regenerated cellulose films, paper reinforced cellulose casings, both in flat form and in tubular form, can be internally treated with a vinyl acetate polymer to produce a coating thereon which is effective in causing the casing to adhere to dry sausage emulsion and follow the shrinkage of the sausage during curing, but has a low level of meat adhesion and releases readily from the dried sausage emulsion when the casing is separated therefrom.

PREFERRED EMBODIMENTS

The term "vinyl acetate polymer" includes within its meaning homopolymers or copolymers which are prepared by copolymerizing vinyl acetate with a wide variety of other monomers. Typical monomers that may be copolymerized with vinyl acetate include acrylic acid, alkyl esters of acrylic acid, such as methyl acrylate, etc., salts of acrylic acid, and particularly alkaline earth and alkali metal salts, such as sodium acrylate, magnesium acrylate, etc., as well as diethylammonium acrylate. Likewise, monomers such as acrolein, methacrylic acid, maleic acid, and derivatives thereof, such as esters, salts, etc., vinyl sulfonic and vinyl phosphonic acids may also be used. Preferred comonomer materials are the acrylates, such as butyl acrylate, ethyl acrylate, and ethylhexyl acrylate. If present, one or more of the monomers listed above or others may be copolymerized with vinyl acetate, and generally make up 5–45% by weight of the total monomer mixture including the vinyl acetate component.

Thus, by the term "vinyl acetate polymer" is meant a polyalkane having integral therewith acetate groups on the polymer backbone and includes both the homopolymer of vinyl acetate and copolymers thereof.

Polyvinyl acetate is preferred in the practice of the present invention. Polyvinyl acetate is prepared by emulsion polymerization and latexes containing polyvinyl acetate having molecular weights of 25,000–200,000 and are preferred for use in the invention.

In coating tubular regenerated cellulose sausage casings, both unreinforced and fibrous types, aqueous vinyl acetate polymer latexes are used containing about 0.10% to about 50.0% by weight of the vinyl acetate polymer, and preferably about 2 to 8% by weight.

In carrying out this invention, the aqueous latex containing the vinyl acetate polymer is applied to the ultimate meat contacting surface of the casing, or sheet material from which the casing is to be formed, so that an amount in the range from about 0.1–10% of the vinyl acetate polymer is applied to the casing.

The vinyl acetate polymer coating can be applied to the casing in any desired way. Thus, application to conventional tubular regenerated cellulose casing, fibrous casing, or any other kind of casing can be made by a technique which involves the use of a slug of aqueous latex, of the coating ingredients inside the tube. In this method of coating, the casing moves while the slug of liquid remains still, with the result that the inner surface of the casing is wetted and coated and then moves on beyond the slug to a casing dryer. A detailed description of this "slug" method of coating is disclosed in U.S. Pat. No. 3,393,223, the teachings of which are herein incorporated by reference.

An alternative technique for applying the vinyl acetate polymer to the inside surfaces of a tubular casing is to apply the vinyl acetate polymer to the surface or surfaces of cellulosic sheets per se before they are formed into tubes. For example, sheets of cellulose impregnated fibrous sheeting can be treated in accordance with the present invention by applying to the surface thereof, a coating of the vinyl acetate polymer from a polymer latex, in an amount sufficient to uniformly coat the casing surface with about 1–10% by weight of the polymer. After this treatment, the sheeting can be formed into a tube by any conventional technique. Additional coating may be applied to the sheet after it has been impregnated with cellulose and the coating may be applied to the sheet material in a bath through which the sheet passes prior to being dried. The coating can also be applied to the sheet after it has been washed and dried.

A further technique for applying the vinyl acetate polymer to the tubular casing is to incorporate the polymer into the viscose solution from which the casing is prepared in an amount of 0.10–5.0% based on the weight of the casing.

After application of the vinyl acetate polymer coating, the casings can be dried at a temperature of about 200° F. for a period of 5 to 15 minutes.

The following Examples illustrate the practice of the present invention.

EXAMPLE I

A latex containing 6% by weight polyvinyl acetate having a molecular weight of approximately 100,000 was applied to the inside surfaces of fibrous casing by the slug procedure of U.S. Pat. No. 3,383,223. This procedure was effective to apply to the casing a a coating weight of 0.4% based on the weight of the casing.

The internally coated casings were stuffed with pepperoni emulsion according to standard commercial practice. The stuffed casings were cured over a period of 30–40 days at a temperature of 50°–60° F. and relative humidity of 70%. Over this period of time there was a very substantial shrinkage of the sausage as the sausage emulsion cured, and in each case the casing adhered to and followed the shrinkage of the sausage so that there was no separation of the casing from the sausage. After the curing was completed, the casings were found to strip from the encased sausage meat without any substantial adherence of meat thereto.

EXAMPLE II

A ribbon of paper to be used for the manufacture of fibrous casing was dipped into a latex containing 6–8% by weight of the polyvinyl acetate used in Example I to incorporate 8% by weight of the polymer in the paper. The polyvinyl acetate coated paper was then formed into fibrous casing using conventional manufacturing procedures.

The polyvinyl acetate coated casings were stuffed with hard salami dry sausage according to standard commercial practice. The stuffed casings were cured over a period of 30–40 days at a temperature of 50°–60° F. and relative humidity of 70%. Over this period of time there was substantial shrinkage of the sausage as the sausage emulsion cured and in each case the casing adhered to and followed the shrinkage of the sausage so that there was no separation of the casing from the sausage. After curing was completed, the casings were found to strip from the sausage product without any substantial adherence of meat to the internal walls of the casing.

What is claimed is:

1. A smoke and moisture permeable synthetic sausage casing for dry sausage comprising a thin continuous tube formed from regenerated cellulose or fiber reinforced regenerated cellulosic casing having an internal wall surface for contact with sausage meat ultimately stuffed therein, there being applied to the ultimate sausage meat contacting internal wall surfaces of the casing about 0.1 to about 10% by weight based on the weight of the casing of a vinyl acetate polymer.

2. The casing of claim 1 wherein the vinyl acetate polymer is polyvinyl acetate.

* * * * *